(12) United States Patent
Yu et al.

(10) Patent No.: US 8,073,258 B2
(45) Date of Patent: Dec. 6, 2011

(54) USING HANDWRITING RECOGNITION IN COMPUTER ALGEBRA

(75) Inventors: Jinsong Yu, Sammamish, WA (US); Seth Atkinson, Redmond, WA (US); Xin Li, Redmond, WA (US); Luke Kelly, Bellevue, WA (US); Larry Israel, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1140 days.

(21) Appl. No.: 11/843,645

(22) Filed: Aug. 22, 2007

(65) Prior Publication Data

US 2009/0052777 A1 Feb. 26, 2009

(51) Int. Cl.
*G06K 9/00* (2006.01)

(52) U.S. Cl. ......... 382/187; 382/186; 382/314; 708/131

(58) Field of Classification Search .................. 345/473; 379/908; 382/181, 186, 187, 189, 200, 201; 704/3, 270, 270.1; 708/131, 160, 200
See application file for complete search history.

(56) References Cited

U.S. PATENT DOCUMENTS

| | | | |
|---|---|---|---|
| 5,627,914 A | | 5/1997 | Pagallo |
| 5,655,136 A | | 8/1997 | Morgan |
| 6,795,838 B1 * | | 9/2004 | Kataoka ................ 708/160 |
| 7,137,076 B2 | | 11/2006 | Iwema et al. |
| 7,181,068 B2 | | 2/2007 | Suzuki et al. |
| 7,490,041 B2 * | | 2/2009 | Davis ..................... 704/270 |
| 7,561,739 B2 * | | 7/2009 | Xu et al. ................ 382/186 |
| 7,917,558 B2 * | | 3/2011 | Uejima .................. 708/131 |
| 2003/0016873 A1 * | | 1/2003 | Nagel et al. ............ 382/228 |
| 2004/0015342 A1 | | 1/2004 | Garst |
| 2004/0054701 A1 * | | 3/2004 | Garst ..................... 708/131 |
| 2006/0001667 A1 * | | 1/2006 | LaViola et al. ........ 345/473 |
| 2006/0062470 A1 | | 3/2006 | Zhu et al. |
| 2006/0062471 A1 * | | 3/2006 | Xu et al. ................ 382/186 |
| 2009/0052777 A1 * | | 2/2009 | Yu et al. ................. 382/187 |

FOREIGN PATENT DOCUMENTS

GB    WO2006136849 A1    12/2006

OTHER PUBLICATIONS

Wan, "An Interactive Mathematical Handwriting Recognizer for the Pocket PC", retrieved on Jun. 28, 2007, at <<http://www.orcca.on.ca/MathML/MathHWRec/abstract.html>>, pp. 1-4.

Fujimoto et al, "A Handwriting Interface to Various Computer Algebra Systems via OpenXM Framework", retrieved on Jun. 28, 2007, at <<http://personales.unican.es/iglesias/ACA-Session/Fujimoto.htm>>, pp. 1-2.

Okamura et al, "Handwriting Interface for Computer Algebra Systems" retrieved at <<http://www.inftyproject.org/articles/1999_ATCM_Okamura.pdf>>, p. 10.

* cited by examiner

*Primary Examiner* — Gregory M Desire
(74) *Attorney, Agent, or Firm* — Alleman Hall McCoy Russell & Tuttle LLP

(57) ABSTRACT

Systems and methods for use in handwriting recognition in computer algebra are provided. One disclosed method includes receiving handwriting input from a user via a handwriting input device, the handwriting input representing a mathematical expression. The method further includes, at a recognizer, processing the handwriting input to recognize a plurality of candidates and ranking the plurality of candidates to form initial candidate data. The method may further include, at an application program, scanning the plurality of candidates for segments that match application-level criteria, and adjusting a rank of one or more of the plurality of candidates based on the matching, to form a processed candidate list. The method may further include displaying the processed candidate list via a graphical user interface.

20 Claims, 3 Drawing Sheets

USING HANDWRITING RECOGNITION IN COMPUTER ALGEBRA

BACKGROUND

Computer algebra systems are designed to assist engineers and students alike in visualizing and evaluating mathematical expressions. One challenge faced by users of such computer algebra systems is that it is often difficult to input into the computer algebra system mathematical notation in the form it appears in a textbook or publication, via a sequence of keyboard strokes or mouse clicks. While each computer algebra system may include its own input methods, there is no common standard for inputting mathematical notation.

For these reasons, users of different computer algebra systems must master a variety of different input methods, which can be confusing. Even when using a single system, the complexity of current input methods are difficult to master, particularly for beginning users, and thus pose a barrier to learning. Many such methods involve using keywords that are meaningful in a specific language, and therefore introduce difficulties in localization when the system is released in different languages. Other methods involve using complicated button palettes to incorporate a structural template for the input. The use of such button palettes and structural templates can result in undesirably slow input speeds for users.

For the above discussed reasons, some users find current computer algebra system input methods to be inefficient for entering mathematical expressions.

SUMMARY

Systems and methods for use in handwriting recognition in computer algebra are provided. One disclosed method includes receiving handwriting input from a user via a handwriting input device associated with a graphical user interface of an application program, the handwriting input representing a mathematical expression. The method further includes, at a recognizer configured to communicate with the application program via an application programming interface, processing the handwriting input to recognize a plurality of candidates and ranking the plurality of candidates to form initial candidate data. The method may further include, at an application program, scanning the plurality of candidates for segments that match application-level criteria, and adjusting a rank of one or more of the plurality of candidates that match the application-level criteria, to form a processed candidate list. The method may further include displaying the processed candidate list including the plurality of candidates with rank adjusted based on application-level criteria, via the graphical user interface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
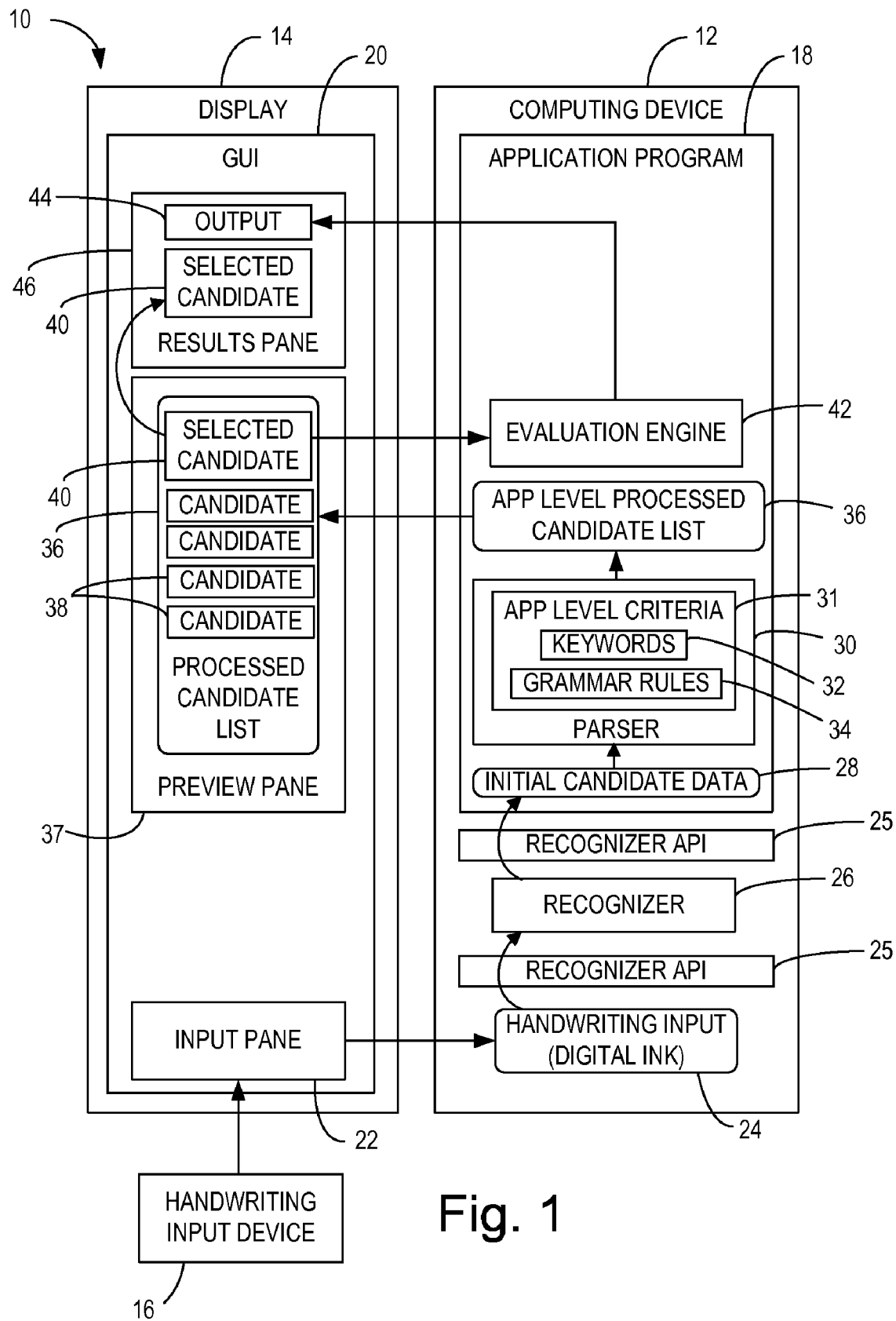
FIG. 1 is a schematic view of one embodiment of a system for use in handwriting recognition in computer algebra.

FIG. 1 illustrates a system 10 for use in handwriting recognition in computer algebra. System 10 typically includes a computing device 12 and associated display 14 and handwriting input device 16, which may include a touch sensitive surface and/or stylus. Computing device 12 is configured to execute an application program 18, such as a computer algebra program, which is configured to display on display 14 a graphical user interface 20 having a handwriting input pane 22. Application program 18 is also configured to receive handwriting input 24, also referred to as digital ink, which represents a mathematical expression. The handwriting input 24 is received from the handwriting input device 16 via the handwriting input pane 22 of the graphical user interface. The handwriting input 24 is passed to a recognizer 26 also executed on the computing device 12, via a recognizer application programming interface (API) 25.

The recognizer 26 contains is a software module containing executable code configured to process the handwriting input 24 to recognize a plurality of text candidates, rank the plurality of candidates in initial candidate data 28, and return the initial candidate data 28 to the application program via the recognizer API 25.

For better performance and to conserve storage space, the recognizer 26 may represent the candidates in initial candidate data 28 using a tree hierarchy instead of a flat list. For example, one ink stroke may have three different possible recognitions: capital letter "O", lower case letter "o", and the digit "0". Another ink stroke within the same handwriting input may have four different possible recognition results: the letter "q", the letter "g", the digit "9", and the digit "4". If the recognizer returns all possible combinations in a flat list, twelve elements would be required to cover the combinations. However, if there are seven other characters in the input and each of them has five possible recognition results, the flat list must contain close to one million elements. The size of the initial candidate data 28 may be efficiently controlled using a tree hierarchy to represent the initial candidate data. The recognizer 26 is configured to rank the candidates, to give the application program an indication of what alternatives are more likely than the others. Thus, in addition to the possible interpretations for each ink stroke, associated rank information may also be stored in the hierarchy.

Upon receiving the initial candidate data 28 from the recognizer, the application program is configured to compose the tree hierarchy of the initial candidate set into text form, or other suitable form, for processing by a parser 30. The text or other suitable form of each of a plurality of possible candidates from the initial candidate data 28 is passed to the parser 30, typically in order of highest rank to lowest as determined by the recognizer 26. The parser 30, in turn, scans the plurality of candidates in the initial candidate data 28 for segments that match application-level criteria 31, such as semantic keywords 32 or grammatical rules 34, and adjusts a rank of one or more of the plurality of candidates that match the application-level criteria 31, to form a processed candidate list 36. The application program 18 displays the processed candidate list 36 including a plurality of candidates 38 with rank adjusted based on application-level criteria, via a preview pane 37 of graphical user interface 20. In addition to keywords 32 and grammatical rules 34, it will be appreciated that a variety of other application-level criteria 31 may be used to adjust the rank of the plurality of candidates 38 in the processed candidate list. For example, the parser 30 may be configured to parse each of the plurality of candidates and adjust a rank of the candidates 38 based at least whether a syntax error is encountered during parsing of one or more of the candidates 38.

It will be appreciated that the candidates 38 displayed in the processed candidate list in preview pane 37 are typically displayed in rank order based at least in part on application-level criteria 31. Thus, in the depicted embodiment the top or first entry in the list has been ranked as the most likely to be the user's intended input by the application program 18.

The preview pane 37 may be configured to enable a user to select a selected candidate 40 from the processed candidate list 36 as an intended input. The selected candidate may be passed to an evaluation engine 42 of the application program 18, for evaluation, such as solving, graphing, or otherwise processing the mathematical expression contained in the selected candidate 40. An output 44 of the evaluation engine may be displayed in a result pane 46 of the graphical user interface along with the selected candidate 40. The output 44 may take the form, for example, of a numerical solution, an algebraic solution, a visual representation such as a graph, etc.

The following are examples of various grammatical rules 34 and keywords 32 that may be matched by the parser 30 to rank the candidates 38 in the processed candidate list 36. For example, the application program 18 may include a grammatical rule 34 that does or does not allow multiple-character variable names. If such names are allowed, "ab" would be interpreted as a single variable named "ab", otherwise it would be treated as implicit multiplication between two variables "a" and "b". The recognizer 26 may not know how the application program 18 will interpret it. Thus, the parser 30 of the application program 18 may be configured to match the candidates 38 against the grammatical rule 34 that multiple character variable names are (or are not) allowed, and rank candidates according to the results of the matching.

Example keywords 32 that may be known to the application program 18 but not the recognizer 26 include well known function names, such as "sin" and "cos", in addition to many other function names that are not standardized across application programs. For example, some application programs may choose to use "Average" as the function name to compute the average of several numbers, while other may choose "Avg" or "Mean" for the same function. Further, other application programs may use a foreign language equivalent of one of these terms. Thus, the parser 30 of the application program 18 described herein may be equipped with a large set of keywords 32 that are known to the application program, and candidates 38 may be ranked based on matching to the keywords 32. Higher ranks may be achieved by candidates 38 that contain keywords 32 understood by the application program 18.

As one example, for the handwritten input "plot", the recognizer 26 would likely rank the candidate "p10t" higher than "plot", since the recognizer 26 tends to emphasize number input higher than letter input, and since the recognizer 26 is unaware of "plot" as a keyword. Thus, if "plot" is registered as a keyword in the application program 18, this recognizer 26 ranking would potentially harm the recognition accuracy. To mitigate this potential harm, the application program 18 can scan the candidates 38 in the initial candidate data 28 against its list of keyword 32 in localized segments. If some combination of lower-ranked alternatives in the tree hierarchy of initial candidate data 28 matches one of the keywords 32, the application program 18 is configured to boost the ranking of this combination and therefore make the one or more candidates 38 containing this combination more likely to be chosen as one of the limited number of candidates presented to the user in the preview pane.

As another example of grammatical rules 34 that may be utilized by the above described embodiments, the application program 18 may contain grammatical rules 34 indicating that the application program 18 uses subscripts as part of the variable name such as "$x_1$", or that it uses subscripts to denote the number base such as "$100110110_2$", or that it may accept both depending on the context.

With regard to syntax errors, the parser 30 may be configured to raise errors if it finds unacceptable patterns in the input text. Some errors may be common to many types of application programs 18; for example, the input should not start with closing parenthesis. Other errors may be specific to a certain type of application program 18. For example, in an application program 18 configured to use subscripts to denote number bases, "$101100110_2$" would be determined to be acceptable but "$121001_2$" would not, since only digits 0 and 1 are acceptable in a binary number.

Figure 2:
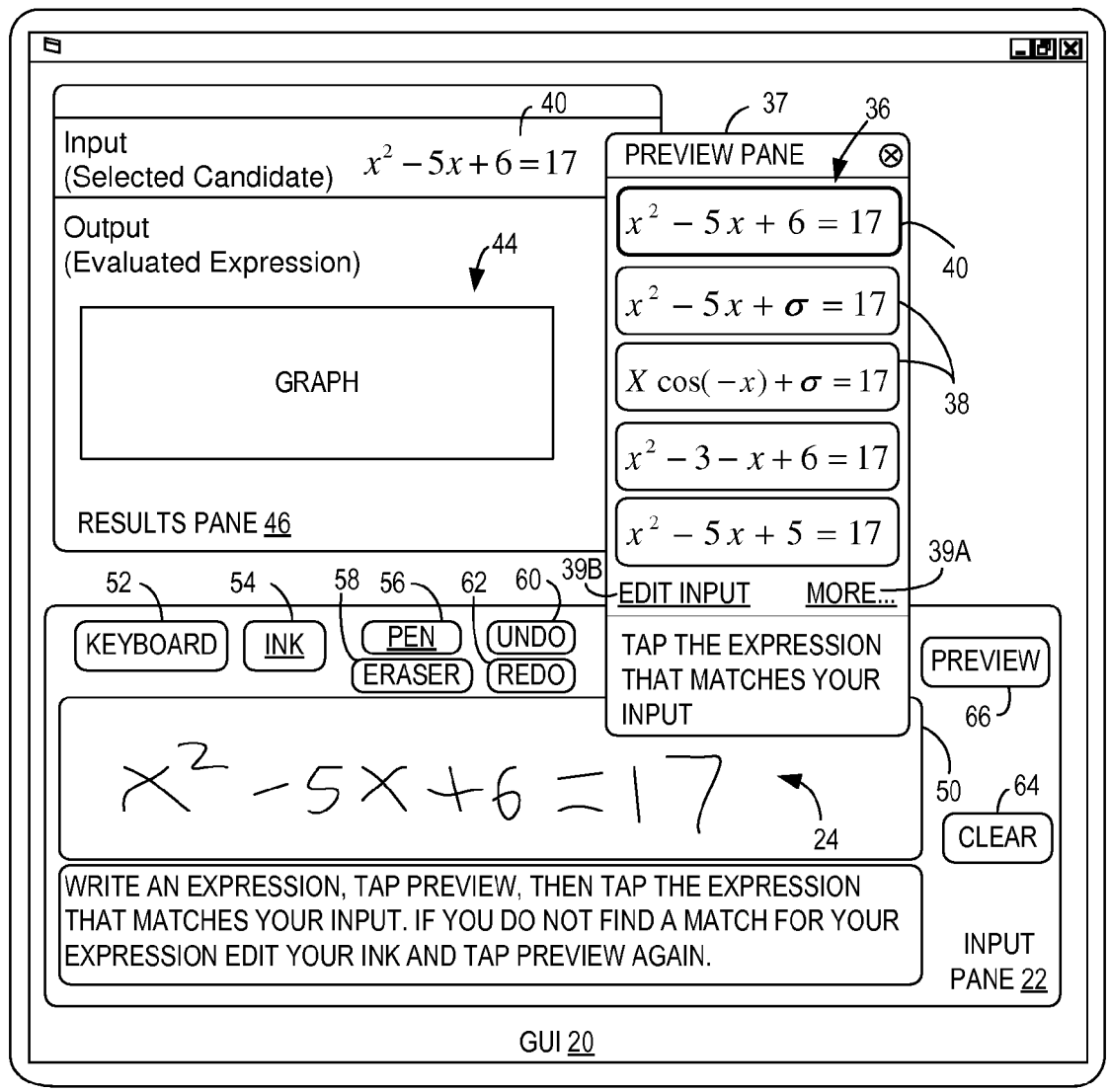
FIG. 2 is a schematic view of a graphical user interface of the system of FIG. 1.

FIG. 2 illustrates in detail the graphical user interface 20 of system 10. As described above, graphical user interface 20 includes an input pane 22 configured to receive handwriting input 24 in a handwriting input box 50. A keyboard input selector 52 and handwriting input selector 54 may be provided to toggle between keyboard input and handwriting input modes. When in handwriting input mode, a pen selector 56 and eraser selector 58 may be selected by the user to toggle between pen and eraser mode. Undo selector 60, redo selector 62, and clear selector 64 are provided to enable the user respectively to undo and redo a recent input, and to clear all handwriting input 24 from the handwriting input box 50.

Once the handwriting input 24 is entered by the user, the user may select preview, for example, by tapping a stylus on the preview selector 66 as the depicted instructions indicate. This will cause preview pane 37 to be displayed with the plurality of candidates 38 listed in rank order in processed candidate list 36. The user may select a selected candidate, for example, by tapping a stylus on the desired candidate in the processed candidate list 36, as indicated in the depicted instructions. Should the user not find the intended mathematical expression in the processed candidate list 36, the user may select an additional candidates selector 39A to display more candidates if available, or may choose a edit input selector 39B to return to the handwriting input box 50 to edit or reenter the handwriting input 24.

Once the user selects selected candidate 40 via the preview pane 37, the preview pane typically disappears, and the selected candidate is displayed in results pane 46, along with associated output 44, such as an algebraic solution, numerical solution, graph, etc., produced by evaluation engine 42.

Figure 3:
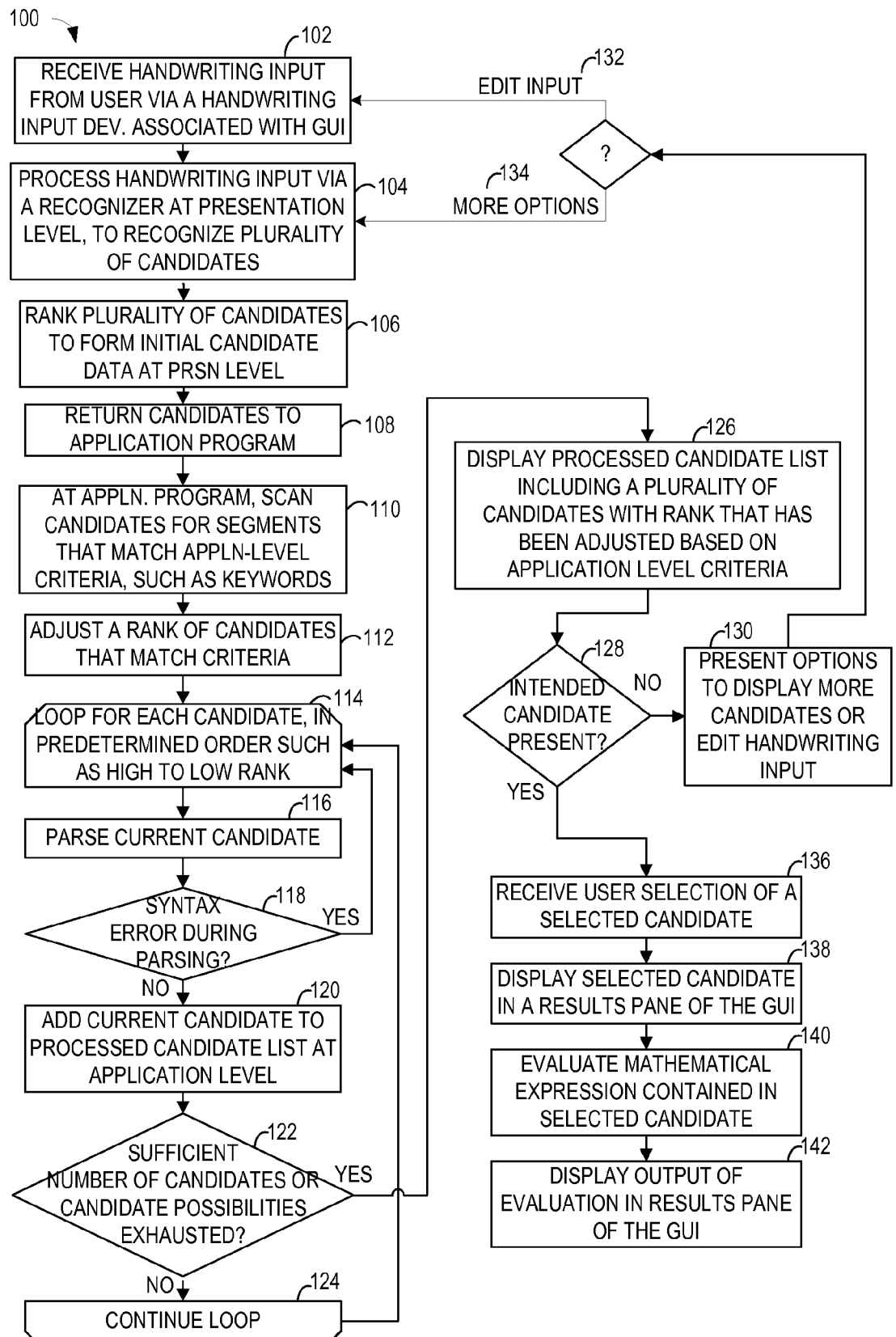
FIG. 3 is a flowchart of one embodiment of a method for use in handwriting recognition in computer algebra.

FIG. 3 illustrates one embodiment of a method 100 for use in handwriting recognition in computer algebra. Method 100 may be implemented utilizing the systems described above, but is not to be understood as limited to such, since implementation on other systems is also possible. As illustrated at 102, the method may include receiving handwriting input from a user via a handwriting input device associated with a graphical user interface of an application program, the handwriting input containing a mathematical expression. At 104, the method may include, at a recognizer configured to communicate with the application program via an application programming interface, processing the handwriting input to recognize a plurality of candidates. At 106, the method may include, at the recognizer, ranking the plurality of candidates to form initial candidate data, at the presentation level. At 108, the method may include returning the plurality of candidates to application program.

At 110, the method includes, at an application program, scanning the plurality of candidates for segments that match application-level criteria. The application-level criteria may include keywords or grammatical rules, for example, as discussed above. At 112, the method includes, at the application program, adjusting a rank of one or more of the plurality of candidates that match the application-level criteria, to form a processed candidate list.

At 114, the method may include, looping for each candidate in a predetermined order, such as from highest rank to lowest as determined by the recognizer. On each loop, the method may include at 116, parsing a current candidate via a parser of the application program, according to application-level syntactical and/or grammatical rules, and at 118, determining whether a syntax error occurred during parsing. If no syntax error is determined to have occurred during parsing, the method may include at 120, adding the current candidate to a processed candidate list at application-level. And, if a syntax error is determined to have occurred during parsing the current candidate, then at 122 the method may include determining whether a sufficient number of candidates has been successfully added to the processed candidate list or whether all candidate possibilities have been exhausted, and may continue looping at 124 until the outcome of the determination at 122 is YES.

At 126, the method includes, displaying the processed candidate list including the plurality of candidates with rank adjusted based on application-level criteria, via the graphical user interface, for example, in a preview pane that may float or pop up over a user input pane of the graphical user interface.

If at 128, the intended candidate is not present in the processed candidate list, at 130, the method may further include presenting user selectable options to display more candidates and/or edit the handwriting input, such as via additional candidates selector 39A and edit input selector 39B described above. Depending on the user's selection, the method may further include either receiving a user selection to edit input, as shown at 132, or receiving a user selection to display more candidates, as shown at 134, and return to 102 or 104 as appropriate.

If at 128, the candidate intended by the user is present in the processed candidate list, at 136, the method may further include receiving a user selection of a selected candidate. At 138, the method may include displaying the selected candidate in a results pane of the graphical user interface. At 140, the method may include evaluating a mathematical expression contained in the selected candidate. At 142, the method may include displaying an output of the evaluating in the results pane of the graphical user interface, which output may take the various forms described above.

The systems and method described above may be used to process handwriting input entered into application programs such as computer algebra systems, and efficiently recognize and rank candidates based on the handwriting input in a manner that utilizes application-specific knowledge.

It will be appreciated that the computing devices described herein may be any suitable computing device configured to execute the programs and display the graphical user interfaces described herein. For example, the computing devices may be a personal computer, calculator, laptop computer, portable data assistant (PDA), computer-enabled wireless telephone, networked computing device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method for use in handwriting recognition in computer algebra, comprising:
   receiving handwriting input from a user via a handwriting input device associated with a graphical user interface of an application program, the handwriting input containing a mathematical expression;
   at a recognizer configured to communicate with the application program via an application programming interface, processing the handwriting input to recognize a plurality of candidates;
   at the recognizer, ranking the plurality of candidates to form initial candidate data;
   at an application program, scanning the plurality of candidates for segments that match application-level criteria;
   at the application program, adjusting a rank of one or more of the plurality of candidates that match the application-level criteria, to form a processed candidate list; and
   displaying the processed candidate list including the plurality of candidates with rank adjusted based on application-level criteria, via the graphical user interface.

2. The method of claim 1, wherein application-level criteria include keywords.

3. The method of claim 1, wherein application-level criteria include grammatical rules.

4. The method of claim 1, further comprising, after ranking the plurality of candidates at the recognizer, returning the plurality of candidates to the application program.

5. The method of claim 1, further comprising:
   looping for each candidate in a predetermined order, and on each loop:
      parsing a current candidate via a parser of the application program, according to application-level syntactical and/or grammatical rules;
      determining whether a syntax error occurred during parsing;
      if no syntax error is determined to have occurred during parsing, adding the current candidate to a processed candidate list at application-level; and
      if a syntax error is determined to have occurred during parsing the current candidate, then continuing looping until a sufficient number of candidates has been successfully added to the processed candidate list or until candidate possibilities have been exhausted.

6. The method of claim 5, wherein the predetermined order is a highest to a lowest rank as determined by the recognizer.

7. The method of claim 1, wherein the processed candidate list is displayed in a preview pane of the graphical user interface.

8. The method of claim 1, further comprising, receiving a user selection of a selected candidate.

9. The method of claim 8, further comprising, displaying the selected candidate in a results pane of the graphical user interface.

10. The method of claim 9, further comprising, evaluating a mathematical expression contained in the selected candidate.

11. The method of claim 10, further comprising, displaying an output of the evaluating in the results pane of the graphical user interface.

12. The method of claim 11, further comprising presenting user selectable options to display more candidates and/or edit handwriting input.

13. The method of claim 12, further comprising receiving a user selection to edit input.

14. The method of claim 12, further comprising receiving a user selection to display more candidates.

15. A system for use in handwriting recognition in computer algebra, comprising:
an application program and a recognizer each executable on a computing device, the application program being configured to display a graphical user interface on a display associated with the computing device, and being configured to receive handwriting input from a handwriting input device associated with the computing device, via the recognizer, the handwriting input representing a mathematical expression;
wherein the recognizer is configured to process the handwriting input to recognize a plurality of candidates, rank the plurality of candidates in initial candidate data, and return the initial candidate data to the application program via an application programming interface;
wherein the application program is configured to scan the plurality of candidates for segments that match application-level criteria, and adjust a rank of one or more of the plurality of candidates that match the application-level criteria, to form a processed candidate list, and display the processed candidate list including the plurality of candidates with rank adjusted based on application-level criteria, via the graphical user interface.

16. The system of claim 15, wherein the handwriting input device includes a touch sensitive surface and/or a stylus.

17. The system of claim 15, wherein the application-level criteria include one of keywords and grammatical rules.

18. The system of claim 15, wherein the application program further includes a parser configured to parse each of the plurality of candidates and adjust a rank of the candidates based at least whether a syntax error is encountered during parsing.

19. The system of claim 15, wherein the processed candidate list is configured to be displayed in a preview pane of the graphical user interface, the preview pane being configured to enable a user to select a selected candidate from the processed candidate list as an intended input.

20. A system for use in handwriting recognition in computer algebra, comprising, a computer program executable on a computing device to display a graphical user interface having:
an input pane configured to receive handwriting input representing a mathematical expression from a handwriting input device;
a preview pane configured to display a processed candidate list of recognized candidate mathematical expressions based on the handwriting input, in a rank order based on matching with application-level criteria, the candidate mathematical expressions being selectable by a user as an intended input; and
a result pane configured to display a selected candidate mathematical expression that is selected by the user as the intended input.

\* \* \* \* \*